United States Patent
Boecking

(10) Patent No.: US 6,817,542 B2
(45) Date of Patent: Nov. 16, 2004

(54) VALVE FOR REGULATING FLUIDS

(75) Inventor: Friedrich Boecking, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 8 days.

(21) Appl. No.: 10/238,702

(22) Filed: Sep. 10, 2002

(65) Prior Publication Data

US 2003/0052184 A1 Mar. 20, 2003

(30) Foreign Application Priority Data

Sep. 15, 2001 (DE) .......................... 101 45 622

(51) Int. Cl.⁷ ............................................... B05B 1/08
(52) U.S. Cl. .................... 239/102.1; 123/498; 310/326; 251/129.06
(58) Field of Search .................. 123/498; 310/326, 310/327; 239/102.2, 102.1; 251/129.06

(56) References Cited

U.S. PATENT DOCUMENTS 6,079,641 A * 6/2000 Shinogle et al. ......... 239/533.4
6,155,532 A * 12/2000 Heinz et al. ................ 251/57
6,367,453 B1 * 4/2002 Igashira et al. ............. 123/467

* cited by examiner

Primary Examiner—Thomas Denion
Assistant Examiner—Zelalem Eshete
(74) Attorney, Agent, or Firm—Michael J. Striker

(57) ABSTRACT

A valve for regulating fluids includes a piezo actor (2), a converter (3) for converter the stroke of the piezo actor, an inwardly opening control valve (11), which is disposed in a valve chamber (12) and on a first valve seat (14), closes a connection to a low-pressure line (18). A nozzle needle (20) is disposed in the control chamber (21). The control chamber (21) is connected with a high-pressure line (19) via a first supply throttle (22) and with the valve chamber (12) by means of a throttle (23), whereby the valve chamber (12) is connected with the high-pressure line via a second supply throttle (24), in order to make possible a fast closing of the valve.

9 Claims, 1 Drawing Sheet

VALVE FOR REGULATING FLUIDS

BACKGROUND OF THE INVENTION

The present invention relates to a valve for regulating fluids, and in particular, a fuel injection valve for a storage injection system.

Many forms of valves for regulating fluids are known in the state of the art. In particular, valves are known, which are formed with a second supply or feed to increase the closing speed of the valve, which makes possible a faster closing of a control valve of a valve and thereby also increases the closing speed of the injection valve.

However, disadvantages are associated with these known valves, such as that with these known valves, only outwardly opening valves can be used, in which the piezo actor and the control valve work in the same direction. Therefore, the known valves required a relatively large total height, so that the valves have a relatively large longitudinal extension. Since particularly in engine chambers, only a relatively small amount of space is available, it is desirable to have a compact injection valve.

SUMMARY OF THE INVENTION

The valve of the present invention for regulating fluids, in contrast, has the advantage that it has an especially short closing time and a control valve that is formed as an inwardly opening valve. Therefore, the inventive valve can be very compactly formed and has only a relative small longitudinal extension. With the invention valve, the operating directions of the piezo actor and the control valve are opposite. In other words, when the piezo actor is regulated and extends in one direction, a control valve of the valve is operated in such a manner that it moves in the opposite operating direction of the piezo actor, and thereby lifts a valve member from a valve seat, in order to make possible an opening of the valve through creating a connection with a low pressure region. In order to make possible a faster closing of the valve, a second supply throttle is provided, which is connected with a valve chamber of the control valve. The second supply throttle of the valve chamber is connected directly with a high-pressure line.

Preferably, a second valve seat opposite to the first valve seat is provided on the control valve, so that in the opened state of the control valve, the connection from the valve chamber to the high pressure line via the second supply throttle on the second valve seat is closed. In this manner, the leakage loss with an opened control valve is minimized.

Preferably, a plate-shaped element is provided on the control valve for closing the second valve seat, and the second valve seat is formed as a flat seat. Thus, the control valve can be simply and compactly formed.

In order to have the least possible number of parts, the plate-shaped element for closing the second valve seat is also formed to operate as a spring seat for an opening spring of the control valve.

According to one embodiment of the invention, the converter of the valve is formed to regulate fluids as a hydraulic converter. The hydraulic converter includes a first piston, a second piston, and a fluid chamber disposed in a working direction between the two pistons. It should be noted that the hydraulic converter could also be formed as a hydraulic coupler, which provides no conversion of the piezo actor lift, rather, only equalizes temperature-related length changes of the piezo actor.

It is especially advantageous if the hydraulic converter is formed so that the two pistons have opposite directions of movement relative to one another. In this manner, an implementation of the movement of the control valve counter to a movement of the piezo actor can be easily realized.

In order to provide an especially cost-effective manufacture, a bearing is arranged on the second piston, which is connected with a fluid chamber of the hydraulic converter. The bearing is therefore fixedly connected, for example, by means of a press-fit, with the second piston. It should be noted that instead of a bearing, a one-piece piston could be used, which is formed as a stepped-off piston with different diameters.

It is also advantageous if the bearing of the second piston, or the second, stepped piston also is formed to act as a spring seat for a sealing spring of the hydraulic converter.

Advantageously, the sealing spring for the hydraulic converter is also used simultaneously as a biasing spring for the actor. In this connection, it is preferred that the first piston is formed as a cup-shaped piston, on whose inner base surface the sealing feather engages and whose outer base surface is connected with the piezo actor. Preferably, the second piston of the hydraulic converter is lead to the cylinder-shaped inner walls of the first piston. Thus, an especially compact construction of the inventive valve can be achieved.

The inventive valve is especially suited for use as a fuel injection valve in a storage injection system. Through the compact construction and the fast closing speed of the inventive valve, the fuel use and the exhaust emission can be positively affected.

DETAILED DESCRIPTION OF THE PREFERRED EMBODIMENTS

Figure 1:
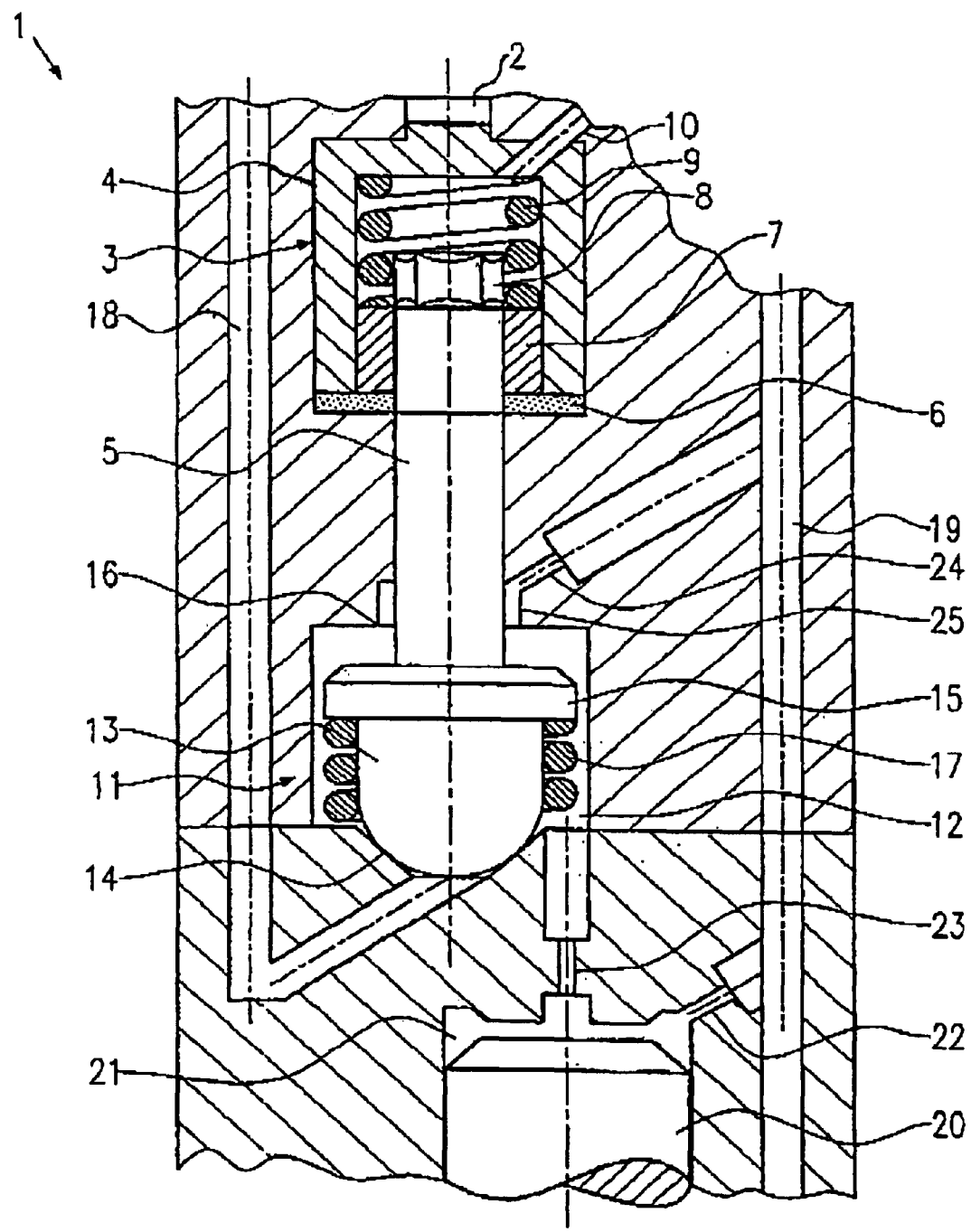
FIG. 1 is a cut-away partial view of a valve for regulating fluids according to one embodiment of the present invention.

In FIG. 1, a fuel injection valve for a storage injection system according to one embodiment of the present invention is represented.

As FIG. 1 show's, the valve 1 includes a piezo actor 2, which is connected to a control valve 11 via a hydraulic converter 3. The hydraulic converter 3 includes a first piston 4, a second piston 5, a fluid chamber 6, and a bearing 7, which is connected with the second piston 5 by means of a press fit. In addition, a sealing spring 9 is provided on the hydraulic converter 3, which is braced on the bearing 7. For centering of the sealing spring 9, a nut 8 is screwed onto the first piston 5. Leakage loss on the hydraulic converter can be equalized via a filling line 10.

As shown in FIG. 1, the first piston 4 is essentially cup-shaped, whereby the outer floor region of the first piston 4 is connected with the piezo actor 2. On an inner floor region of the cup-shaped first piston 4, a sealing spring 9 is braced. In addition, the inner cylindrical walls of the first piston 4 serve as guide devices for the second piston 5. The fluid chamber 6 of the hydraulic converter is arranged so that on one side, it is connected with the cylindrical edge of the first piston 4 and on the other side, it is connected with the cylindrical end region of the bearing 7. Depending on the respective selected cylindrical end surfaces of the first piston 4 and the bearing 7, the stroke or lift of the piezo actor 2 can be converted.

As shown in FIG. 1, the second piston 5 is directly connected with the control valve 11. The second piston 5 is connected with a plate-shaped element 15, on which the valve member 13 of the control valve 11 is disposed. The control valve 11 has a first valve seat 14 and a second valve seat 16, which, respectively, are arranged on opposite sides of the valve member 13. The control valve 11 further includes a spring 17, which supports the opening process of the control valve 11. As shown in FIG. 1, the control valve 11 is disposed in a valve chamber 12.

The valve chamber 12 is connected on one side with a control chamber 21 of the valve via a run-off throttle 23 and on the other side, is connected with a high-pressure line 19 via an annular chamber 25 and a second run-off throttle 24. A first supply throttle 22 connects the high-pressure line 19 with the control chamber 21. In addition, in the known manner, a nozzle needle 20 is arranged in the control chamber 21, which opens or closes the valve seat of the valve 1.

In a non-operational state of the piezo actor, which is shown in FIG. 1, the control valve 11 closes the first valve seat 14.

When only one injection of fuel is to take place, the piezo actor 2 is regulated so that the piezo actor 2 extends in the direction of the control valve and thereby, moves the first piston 4 downward. Through the movement of the first piston 4 downwardly, a determined quantify of fluid is emptied into the fluid chamber 6, so that the bearing 7, and with the bearing 7, the second piston 5 moved upwardly against the spring force of the sealing spring 9. Through this movement of the second piston 5 upwardly, the valve member 13 of the control valve 11 likewise moves upwardly, whereby the movement of the valve member 13 is supported by means of the spring 17. Since the valve member 13 is lifted from its first valve seat 14, a connection between the control chamber 21 to the low-pressure line 18 is created via the run-off throttle 23 and the valve chamber 12. Therefore, the pressure in the control chamber 21 is lowered and the nozzle needle 20 moves upwardly, so that an injection of the fuel can take place.

As described above, with the inventive valve, the movement directions of the piezo actor 2 on one side and the control valve 11 on the other side are opposed or contrary, since the control valve 11 is formed to be an inwardly opening valve and the hydraulic converter 3 converts the stroke of the piezo actor in the opposite direction.

As FIG. 1 shows, with the opening of the control valve 11, a connection between the valve chamber 12 and the second run-off throttle 24 can be simultaneously closed, since the plate-shaped element 15 of the control valve 11 on the second valve seat 16 closes the connection on the annular chamber 25 to the second run-off throttle 24. Therefore, the leakage loss with an opened control valve can be kept at a minimum.

When the valve 1 is closed and the injection of fuel should be ended, the piezo actor 2 is again regulated so that it takes its original length, whereby the first piston 4 and the second piston 5 are again brought into their starting positions by means of the sealing spring 9, so that the control valve 11 again lies on the first valve seat 14. In this manner, a high-pressure can one again be formed in the control chamber 21. The high-pressure build up in the control chamber 21 takes place via the second supply throttle 24, the annular chamber 25, the valve chamber 12, and the run-off throttle 23. Thereby, the flow direction in the run-off throttle 23 is reversed as with an opened control valve. Through this construction, a faster closing is achieved, since the pressure formation in the control chamber 21 can take place more quickly via the two supply throttles 22, 24. Through the pressure formation in the control chamber 21, the nozzle needle 20 again moves downwardly in the known manner, thereby ending an injection of fuel.

According to the present invention, by using the inwardly opening control valve 11 and the construction of the hydraulic converter 3 with the cup-shaped first piston 4, in which the further components of the hydraulic converter are arranged, a particularly compact form of the valve can be achieved, especially with regard to longitudinal extension. Through the advantageous construction of the second supply throttle 24, also a fast closing of the inventive valve 1 is made possible.

It will be understood that each of the elements described above, or two or more together, may also find a useful application in other types of constructions differing from the types described above.

While the invention has been illustrated and described herein as a valve for regulating fluids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A valve for regulating fluids, comprising a piezo actor (2), a converter (3) for converting a piezo actor stroke, an inwardly opening control valve (11) disposed in a valve chamber (12), wherein said inwardly opening control valve (11) closes a connection to a low-pressure line (18) on a first valve seat (14), and a nozzle needle (20) arranged in a control chamber (21), wherein the movement of the nozzle needle is regulated by means of the control valve (11), wherein the control chamber (21) is connected with a high-pressure line (19) by means of a first supply throttle (22) and is connected with the valve chamber (12) by means of a throttle (23), wherein the valve chamber (12) is connected with the high-pressure line (19) by means of a second supply throttle (24) in order to enable a fast closing of the nozzle needle, wherein a second valve seat (16) is provided on the control valve (11), so that when the first valve seat (14) of the control valve (11) is opened, the connection from the valve chamber (12) to the high-pressure line (19) is closeable by means of the second supply throttle (24) on the second valve seat (16), and wherein the second valve seat (16) is formed as a flat seat, wherein said flat seat is closeable by a plate-shaped element (15).

2. The valve according to claim 1, wherein the plate-shaped element (15) also serves as a spring seat for an opening spring (17) of the control valve (11).

3. The valve according to claim 1, wherein the converter is a hydraulic converter with a first piston (4) and a second piston (5) and a fluid chamber (6).

4. A valve for regulating fluids, comprising a piezo actor (2), a converter (3) for converting a piezo actor stroke, an inwardly opening control valve (11) disposed in a valve chamber (12), wherein said inwardly opening control valve (11) closes a connection to a low-pressure line (18) on a first valve seat (14), and a nozzle needle (20) arranged in a control chamber (21), wherein the movement of the nozzle needle is regulated by means of the control valve (11), wherein the control chamber (21) is connected with a high-pressure line (19) by means of a first supply throttle (22) and is connected with the valve chamber (12) by means of a throttle (23), and wherein the valve chamber (12) is connected with the high-pressure line (19) by means of a second supply throttle (24) in order to enable a fast closing of the nozzle needle, wherein the hydraulic converter is formed so that the first piston (4) has an opposite direction of movement relative to the second piston (5), and wherein the second piston (5) is a one-piece, stepped piston.

5. A valve for regulating fluids, comprising a piezo actor (2), a converter (3) for converting a piezo actor stroke, an inwardly opening control valve (11) disposed in a valve chamber (12), wherein said inwardly opening control valve (11) closes a connection to a low-pressure line (18) on a first valve seat (14), and a nozzle needle (20) arranged in a control chamber (21), wherein the movement of the nozzle needle is regulated by means of the control valve (11), wherein the control chamber (21) is connected with a high-pressure line (19) by means of a first supply throttle (22) and is connected with the valve chamber (12) by means of a throttle (23), wherein the valve chamber (12) is connected with the high-pressure line (19) by means of a second supply throttle (24) in order to enable a fast closing of the nozzle needle, wherein the converter is a hydraulic converter with a first piston (4) and a second piston (5) and a fluid chamber (6), wherein the hydraulic converter is formed so that the first piston (4) has an opposite direction of movement relative to the second piston (5), wherein.

6. The valve according to claim 5, whereby a bearing (7) is arranged on the second piston (5), wherein said bearing (7) is connected with the fluid chamber (6).

7. The valve according to claim 5, wherein the second piston (5) is a one-piece, stepped piston.

8. The valve according to claim 6, wherein the bearing (7) also serves as a spring seat for a restoring spring (9) of the hydraulic converter.

9. The valve according to claim 8, wherein the restoring spring (9) is also a biasing spring for the piezo actor (2).

* * * * *